(12) United States Patent
Brandhorst

(10) Patent No.: US 7,664,694 B2
(45) Date of Patent: Feb. 16, 2010

(54) VALUATION-TILTED CAPITALIZATION WEIGHTED INVESTMENT METHODS AND PRODUCTS

(75) Inventor: Eric S. Brandhorst, Carlisle, MA (US)

(73) Assignee: State Street Global Advisors, Boston, MA (US)

( * ) Notice: Subject to any disclaimer, the term of this patent is extended or adjusted under 35 U.S.C. 154(b) by 321 days.

(21) Appl. No.: 11/525,549

(22) Filed: Sep. 22, 2006

(65) Prior Publication Data
US 2008/0077537 A1 Mar. 27, 2008

(51) Int. Cl.
*G06Q 40/00* (2006.01)
(52) U.S. Cl. .......................... 705/36 R; 705/35; 705/37
(58) Field of Classification Search ............... 705/36 R, 705/35, 37, 38, 30, 1, 4, 36 T
See application file for complete search history.

(56) References Cited

U.S. PATENT DOCUMENTS

| | | | | |
|---|---|---|---|---|
| 7,206,760 | B1 * | 4/2007 | Carey et al. | .................... 705/35 |
| 2003/0014343 | A1 | 1/2003 | Jones | |
| 2003/0065602 | A1 * | 4/2003 | Yip | .............. 705/36 |
| 2003/0212621 | A1 | 11/2003 | Poulter et al. | |
| 2004/0111350 | A1 | 6/2004 | Charnley, Jr. | |
| 2004/0199448 | A1 | 10/2004 | Chalermkraivuth et al. | |
| 2005/0004857 | A1 | 1/2005 | Schwarz et al. | |
| 2005/0060254 | A1 | 3/2005 | Jones | |
| 2005/0108148 | A1 | 5/2005 | Carlson | |
| 2005/0171884 | A1 | 8/2005 | Arnott | |
| 2005/0246255 | A1 | 11/2005 | Rousseau et al. | |
| 2006/0015433 | A1 | 1/2006 | Arnott et al. | |
| 2007/0055599 | A1 * | 3/2007 | Arnott | ......................... 705/35 |
| 2007/0130043 | A1 * | 6/2007 | O'Shaughnessy et al. | . 705/36 R |

OTHER PUBLICATIONS

Anonymous "Summary of Salomon Brothers' current Stock Research reports." Mar. 3, 1998 PR Newswire , 0303NY4.*
Chung et al. "Are the market effects associated with revisions to the TSE300 index robust?" Mar. 1998, Multinational Finance Journal v2n1 pp. 1-36.*
Chen et al. "Archive knowledge discovery by proxy cache" 2004,Internet Research v14n1 pp. 34-47.*
Anonymous "American Stock Exchange Lists Eight New ETFs From PowerShares." Oct. 26, 2005 , PR Newswire.*
Arnott, Robert D. et al., "Fundamental Indexation", Financial Analysts Journal, Mar./Apr. 2005, pp. 83-99, vol. 61, No. 2, CFA Institute.

* cited by examiner

*Primary Examiner*—Kelly Campen
(74) *Attorney, Agent, or Firm*—Goodwin Procter LLP

(57) ABSTRACT

Investment vehicles and methods for determining the composition of such investment vehicles based on a valuation-tilted, capitalization-weighted technique includes identifying assets to be included in an investment vehicle, calculating a asset valuation for each of the assets, ranking the assets based on their respective asset valuations, based on the ranking, identifying groupings of the assets, determining a group weighting factor for each of the groupings, and determining the composition of the investment vehicle based on the group weighting factors attributed to each of the groupings.

18 Claims, 7 Drawing Sheets

FIG. 6

| | Group | Group Capitalization Weight (CWg) | # of assets | Group Valuation Ratio (Vg) | Group Allocation Factor (GAFg) | Group Strategy Weight (SWg) | Group Strategy Weight - Group Capitalization Weight |
|---|---|---|---|---|---|---|---|
| Low Valuation | 1 | 5.0% | 135 | 0.152 | 2.280 | 11.40% | 6.40% |
| | 2 | 5.0% | 125 | 0.106 | 1.586 | 7.93% | 2.93% |
| | 3 | 5.0% | 87 | 0.092 | 1.374 | 6.87% | 1.87% |
| | 4 | 5.0% | 41 | 0.087 | 1.307 | 6.54% | 1.54% |
| | 5 | 5.0% | 42 | 0.083 | 1.239 | 6.20% | 1.20% |
| | 6 | 5.0% | 50 | 0.079 | 1.182 | 5.91% | 0.91% |
| | 7 | 5.0% | 47 | 0.075 | 1.123 | 5.61% | 0.61% |
| | 8 | 5.0% | 49 | 0.072 | 1.073 | 5.36% | 0.36% |
| | 9 | 5.0% | 72 | 0.067 | 1.011 | 5.05% | 0.05% |
| | 10 | 5.0% | 46 | 0.064 | 0.966 | 4.83% | -0.17% |
| | 11 | 5.0% | 34 | 0.062 | 0.932 | 4.66% | -0.34% |
| | 12 | 5.0% | 56 | 0.059 | 0.886 | 4.43% | -0.57% |
| | 13 | 5.0% | 38 | 0.056 | 0.840 | 4.20% | -0.80% |
| | 14 | 5.0% | 55 | 0.053 | 0.794 | 3.97% | -1.03% |
| | 15 | 5.0% | 67 | 0.049 | 0.735 | 3.68% | -1.32% |
| | 16 | 5.0% | 50 | 0.046 | 0.688 | 3.44% | -1.56% |
| | 17 | 5.0% | 51 | 0.041 | 0.615 | 3.07% | -1.93% |
| | 18 | 5.0% | 52 | 0.037 | 0.552 | 2.76% | -2.24% |
| | 19 | 5.0% | 65 | 0.032 | 0.483 | 2.41% | -2.59% |
| High Valuation | 20 | 5.0% | 38 | 0.022 | 0.334 | 1.67% | -3.33% |
| Universe Information | | 100.0% | 1200 | 0.067 | 1.000 | 100.00% | 0.00% |

VALUATION-TILTED CAPITALIZATION WEIGHTED INVESTMENT METHODS AND PRODUCTS

TECHNICAL FIELD

This invention relates to methods and products for investing assets, and, more particularly, to methods and investment products based on a weighted allocation of investment resources.

BACKGROUND

The primary goal of an investment vehicle is to provide exceptional returns for its investors. One component of an investment vehicle's returns is the returns of the underlying assets that comprise the holdings of the investment vehicle, such as stocks held in a mutual fund. To that aim, financial services firms allocate significant effort and capital to help portfolio managers and analysts identify those assets (or derivatives thereof) that are likely to provide desirable results for the fund, and that will generally outperform other assets and the overall market.

In general, investment portfolio management techniques can be classified as either active management or passive management. Active management, conventionally, describes methods in which the assets (or other underlying investment vehicles) are selected as components of a portfolio based on one or more economic and financial statistics, analyses performed by business analysts, technical trends or some combination of these or other elements. Furthermore, decisions of whether to buy, sell or hold a particular asset or alter a fund's weighting in an asset, industry or geographic market segment are typically performed by individuals (e.g., portfolio and/or fund managers in the case of mutual funds). Such funds are often prone to large variations in performance and the operating costs attributed to many actively managed funds can be significant, and therefore erode returns.

In contrast, passive management (also known as index-based management), relies on pre-defined indices (e.g., the STANDARD & POOR'S 500, the WILSHIRE 5000, etc.), to determine the assets held within a portfolio and the weighting attributed to each asset such that the portfolio's holdings closely approximate those that make up the particular index on which it is based. Some of the advantages of passive management techniques include lower trading costs, lower management costs, and very low fluctuations in performance relative to the underlying index on which the portfolio is based.

Unlike active management techniques, the weightings of assets in a passively managed portfolio are typically based on the relative market capitalization of the assets that comprise the index or, in some cases, the assets are weighted equally. Advantages of using market capitalization weighting as the basis for a passive portfolio include that the index (and therefore a portfolio built on it) remains continually "in balance" as market prices for the included assets change. Market capitalization weighting is also supported by modern portfolio theory, which implies that given certain assumptions, market capitalization weighting generates portfolios that maximize expected risk-adjusted return and is therefore optimal. However, one drawback of capitalization-weighted portfolios is that they can be influenced by valuation errors. For example, investors are motivated to value assets to reflect attributes such as risk and growth, but at any given point in time assets may be undervalued, overvalued, or correctly valued. While investors will attempt to value assets to reflect asset attributes, assets with low valuation may tend to reflect undervaluation errors and assets with high valuation may tend to reflect overvaluation errors.

While attributing a disproportionate amount of assets to lower market capitalization assets (either individually or in groups) may provide certain benefits, it does not consider other possible techniques for evaluating the underlying company (in the case of an equity) that may be indicative of an under priced asset. Nor does such an approach provide any methodology for determining, for example, the optimal groupings (and resultant group weightings) based on such techniques. As a result, opportunities to outperform the index and the market are missed. What is needed, therefore, is an investment vehicle (and supporting techniques for designing and managing such an investment vehicle) that takes advantage of certain operational aspects generally associated with passively managed capitalization-weighted funds, but uses additional statistical analyses and weighting techniques to position a portfolio to benefit from valuation errors as market conditions change, and thereby provide exceptional long-term risk-adjusted returns to investors.

SUMMARY OF THE INVENTION

The present invention provides techniques and investment vehicles that combine the weighting of assets within groupings of available assets by market capitalization and the allocation of capital to capitalization-weighted groupings of the assets within the investment vehicle in order to achieve superior long-term results. In doing so, the present invention benefits from the presence of undervaluation and overvaluation errors that may exist in the market. In addition, the present invention provides techniques and investment vehicles that can adjust the composition of capitalization-weighted groupings of assets as well as the allocation of capital across the groupings in response to market opportunities and benefit from such valuation errors.

The invention provides a methodology for identifying, grouping and weighting groups of assets based on relative valuation as reflected by valuation-ranked groups of assets. The invention exploits the tendency of relative valuation to signal opportunity represented by valuation errors, and allocates capital to reflect that tendency. The invention recognizes and responds to the changing opportunity set of valuation errors with regular rebalancing of strategy positions.

In general, the technique includes calculating a valuation ratio for the entire universe of assets being considered as well as valuation ratios for each grouping of assets. Based on these valuation ratios, and allocation factors and capitalization weights calculated for each grouping, a group strategy weight can be calculated (and periodically recalculated). The group strategy weight may then be used to determine the desired allocation of funds among the groupings.

Therefore, in a first aspect, the invention relates to a method for determining the composition of an investment vehicle (e.g., a mutual fund, an exchange traded fund, or a hedge fund) that includes identifying assets to be included in the investment vehicle, calculating a valuation (e.g., a book value, price, or some combination of the two, for example) for each of the assets, ranking the assets based on the valuation, grouping the assets based on the ranking, determining group strategy weights for each of the groupings and determining the composition of the investment vehicle based on the weighting factors.

In some embodiments, the method also includes calculating a target group capitalization and a group capitalization for each grouping and attributing each asset to a grouping such that the group capitalization is substantially equal to the target group capitalization. The target group capitalization may be based, for example, on the number of groupings and a total capitalization (such as the total market capitalization) for the assets. In certain preferred embodiments, the number of groupings is greater than five. In some cases, the number of groupings is fewer than a predetermined fraction (e.g., 10%) of the total number of assets that comprise the plurality of assets. The ranking, in some versions, includes compiling a listing of the assets based on the valuation—in some cases listing the assets from lowest valuation to highest valuation. The groupings may, in some cases, include assets select from various sections of the listing, whereas in other cases the assets selected for each group represent a continuous subset of the listing based on the ranking.

In some embodiments, the method further includes calculating a target capitalization and a group capitalization for each of the groupings and adding a next asset to a first grouping from the listing until the group capitalization is substantially equal to the target capitalization, whereupon a second grouping is initiated using the next asset from the listing. The group capitalization for each may be, for example, the total market capitalization for the assets attributed to that group.

The method can, in certain cases, also include calculating a total market capitalization for the assets, a total market valuation for the assets, a group capitalization for each grouping and a group capitalization weight, which, in some embodiments, may be determined by dividing the group capitalization for each grouping by the total market capitalization. A group valuation ratio can be determined based on a book value for the assets in each respective grouping, a book value for the assets in each respective grouping divided by a price for the assets in that respective grouping or a book value for the assets in each respective grouping divided by a capitalization for the assets in that respective grouping. By dividing a group valuation ratio by the total market valuation, a group allocation factor can be determined. The group strategy weight may be determined by multiplying the group allocation factor by the group capitalization metric. In addition, any or all of the above-noted metrics, ratios, groupings, ratings, and weighting factor can be recalculated periodically (e.g., daily, weekly, monthly, quarterly, annually), thus adjusting the allocation of funds to the assets within the investment vehicle as the investment opportunities change.

In another aspect, the invention provides an investment vehicle in which the allocations of various assets that comprise the investment vehicle are determined using the methods described above.

In another aspect, the invention provides software in computer-readable form for performing the methods described herein.

BRIEF DESCRIPTION OF DRAWINGS

In the drawings, like reference characters generally refer to the same elements throughout the different views. Also, the drawings are not necessarily to scale, emphasis instead generally being placed upon illustrating the principles of the invention.

FIG. 6 is a tabular representation of one possible grouping and weighting of assets in accordance with one embodiment of the invention.

DETAILED DESCRIPTION

Throughout the text, the following terms are used:

Fund: Any investment vehicle or portfolio that includes a compilation of assets (as described below), including but not limited to mutual funds, finds of funds, exchange traded funds, hedge funds and closed-end mutual finds.

Assets: Any sort of investment including but not limited to stocks, securities, equities, commodities, corporate and government bonds, commodities, fixed-income investments, exchange traded funds, futures, currency and derivatives thereof. In certain cases funds (e.g., mutual funds) may also be referred to as assets, as certain funds are comprised of other funds (e.g., funds of funds) and the methods described herein are equally applicable to such cases.

Portfolio Managers: In some embodiments, portfolio managers can be individuals or teams of individuals hired by a financial services firm to manage funds based on various qualitative and/or quantitative portfolio management principles. Portfolio managers may also include individuals managing investments on their own behalf or on behalf of their clients.

Figure 1:
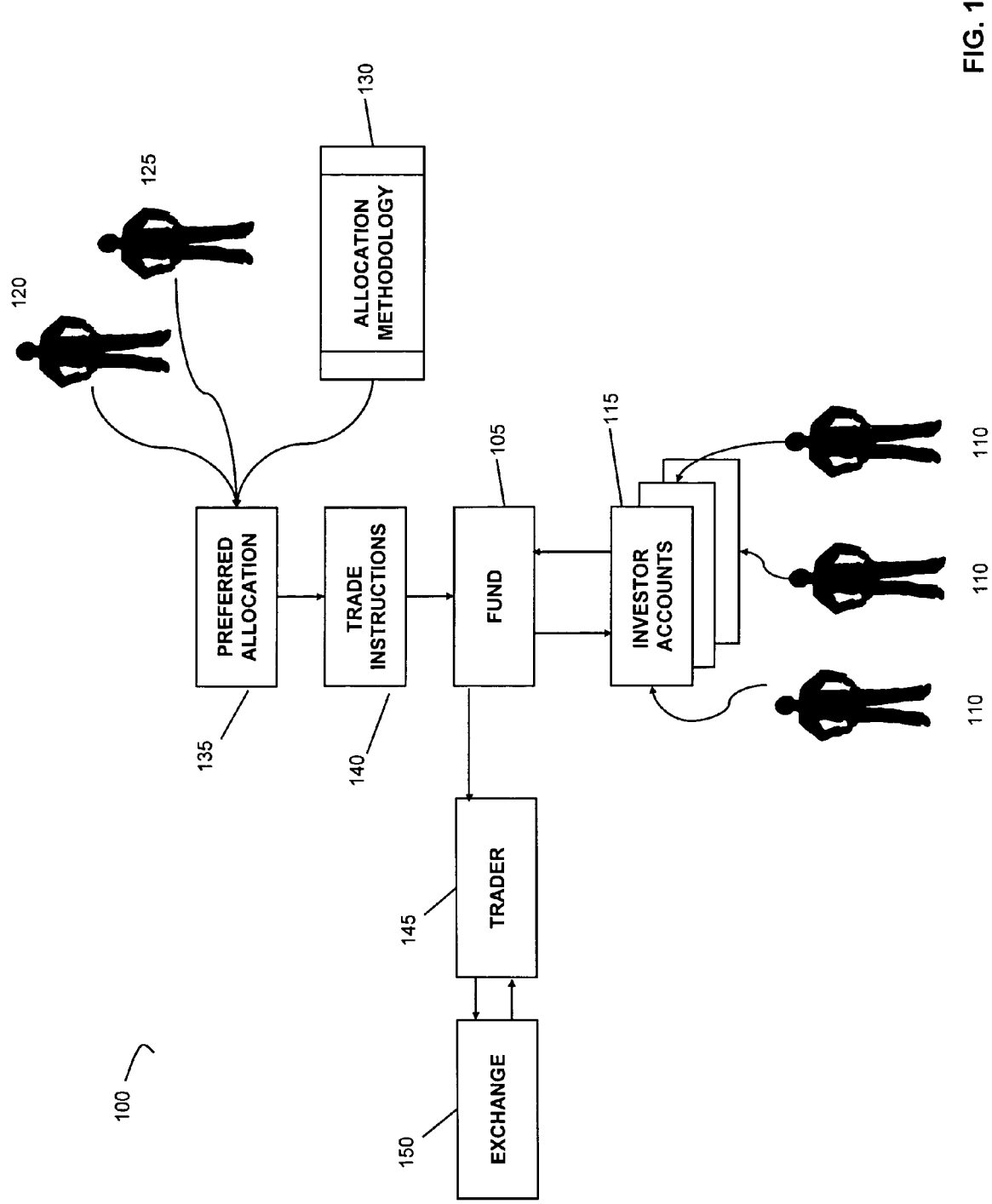
FIG. 1 is a block diagram of an environment in which the techniques described herein may be implemented according to various embodiments of the invention.

FIG. 1 depicts an exemplary environment 100 in which the techniques described herein may be implemented to determine an allocation of investable assets within a fund 105 or other investment vehicle. Typically, the fund 105 provides an opportunity for investors 110 to pool their assets with other investors 110, yet still maintain individual investor accounts 115 that representing their share or shares of the overall fund 105. The allocation of assets within the fund 105 may be determined based on research, analysis, and information received and/or generated by a portfolio manager 120, research analysts 125 and/or an allocation methodology 130, or any combination thereof. For example, allocation methodology 130 may dictate that 70% of a funds holdings must be domestic equities and the remaining 30% be allotted to domestic corporate debt instruments. Further, governmental regulations may, for example, prohibit the fund 105 from allocating more than 5% of its assets to any one equity. Within these guidelines, research analysts 125 and portfolio managers 120 review information (e.g., corporate financials, marketing reports, governmental policies, industry publications, etc.) and use various financial and statistical models to determine a preferred allocation 135 for the fund that both abides by any requirements or prohibitions placed on the fund's holdings and attempts to maximize the investors' returns. Because the preferred allocation 135 may change over time and investors 110 periodically add funds to or remove funds from their accounts 115 the holdings in the fund 105 may require periodic adjustment. In addition, market fluctuations may cause the actual allocation to drift from the preferred allocation 135, necessitating additional adjustments. These adjustments are effectuated through trade instructions 140, which specify buy and/or sell orders of individual (or in some cases groups of) assets. The instructions 140 are routed to one or more traders 145, who in turn submit the instructions to an exchange 150 for execution. One of the ongoing challenges facing the portfolio managers 120, analysts 125, and to a certain extent the individual investors 110 as well, is identifying and maintaining the preferred allocation 135 in such a manner that the fund 105 generates favorable returns (either in absolute terms or relative to one or more benchmarks), but yet is not saddled with excessive trading and/or management fees.

Figure 2:
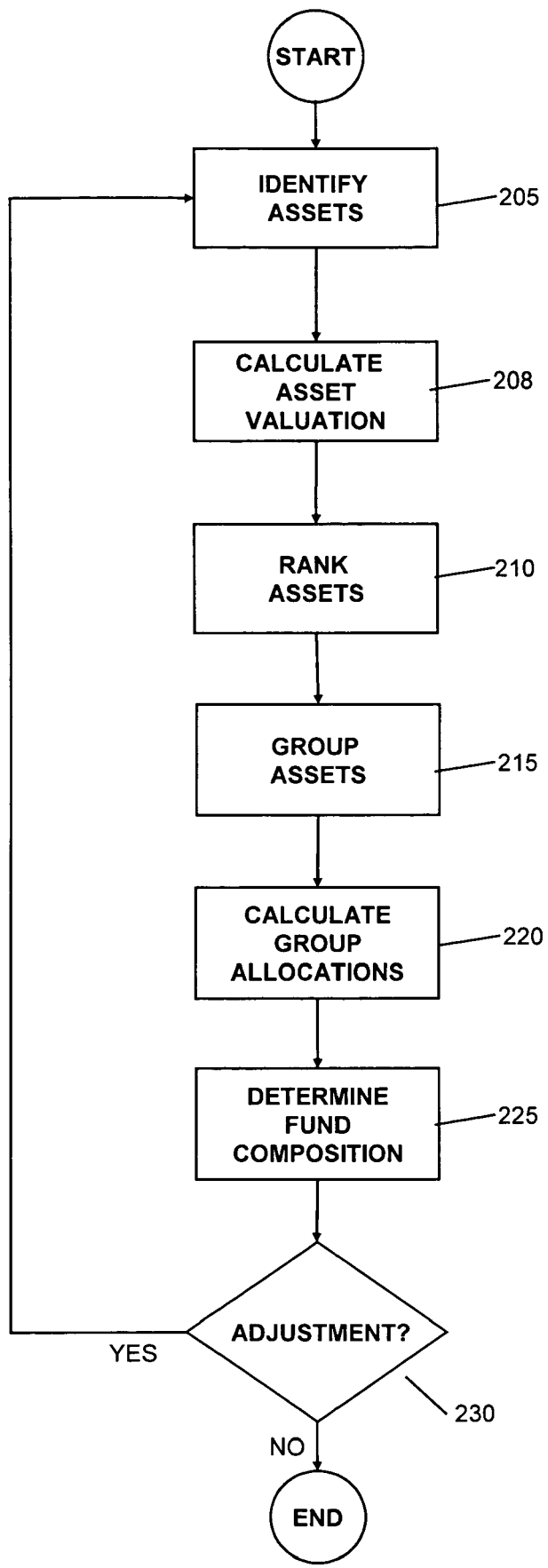
FIG. 2 is a flow chart depicting, in summary, a process for determining the composition of an investment vehicle in accordance with various embodiments of the invention.

FIG. 2 illustrates, at a summary level, how the techniques of one embodiment of the present invention may be employed to determine the preferred allocation 135 and as a result, offer an investment product that conforms to the allocation 135. Initially, the universe of assets in which the fund will invest is determined (STEP 205). The universe can be any collection of assets or groups of assets, including—but not limited to—stocks, corporate bonds, convertible bonds, currencies, commodities, ETFs, mutual funds, etc. Assets can be individual assets or groups of assets that share a common attribute such as an industry, market sector or country.

In some embodiments, a subset of the universe can be identified, representing the assets within the universe that the portfolio managers 120 and/or analysts 125 wish to include in the investment vehicle. The subset can determined by any number of different techniques including, but not limited to: identifying the constituent assets of a published benchmark, identifying assets meeting some specific minimum or maximum criteria as it relates to a measure of the assets size or value such as market capitalization, valuation, fundamental size, industry, sector, country or risk.

In general, the assets can be evaluated (STEP 208) on the basis of some valuation metric. For example, if P represents a price of a tradable quantity of a particular asset such as the price of one share of stock, X represents a per-tradable-quantity-of-asset measure of economic activity or risk of the asset (e.g., book value, dividends, earnings, income, assets, sales, revenue, number of employees, par value, coupon payment, credit spread), C represents the market capitalization of the asset, and Y represents a total asset measure of economic activity or risk (such as book value, dividends, earnings, income, assets, sales, revenue, number of employees, par value, coupon payment, credit spread, etc.), metrics such as P/X, X/P, C/Y or Y/C can provide measures of valuation that may be used for evaluating the assets. In certain embodiments, valuation metrics in which the price P or capitalization C is used as the denominator in the above ratios can be referred to as a valuation ratio V.

As described above, such a determination may be based on analysis performed by the portfolio manager 120 and/or the analysts 125, as well as any allocation methodologies 130 that govern the fund 105. In some embodiments, such analysis may result in the universe of assets being limited to a list of equities in a particular index. As used herein, an index may be a well-known index such as any of the DOW JONES indices, the NASDAQ indices, the RUSSELL indices, the STANDARD & POORS indices, and the LEHMAN BROTHERS indices, to name only a few. In addition, indices related to one or more geographic regions, market segments, technologies, and commodities may be used. In other cases, an analyst 125 or portfolio manager 120 may generate an index, using, for example, software to examine data about entities offering different kinds of assets that may be traded by investors. Once the universe of assets is identified, the assets are ranked (STEP 210) based on one or more valuation factors, such as those described above, and as described in greater detail below. Based on the ranking, the assets are then grouped (STEP 215) based, for example, on a preferred allocation of capitalization. A group strategy weighting ($SW_g$) is calculated (STEP 220) for each group, and based on the allocation factors, the overall fund composition may then be determined (STEP 225). This process may be repeated, either at some fixed periodicity (e.g., daily, weekly, monthly, quarterly, annually, etc.), at random, or in response to a particular event (e.g., market corrections, pricing thresholds, political events, interest rate adjustments, natural disasters, and the like) if an adjustment is deemed necessary (STEP 230).

Figure 3:
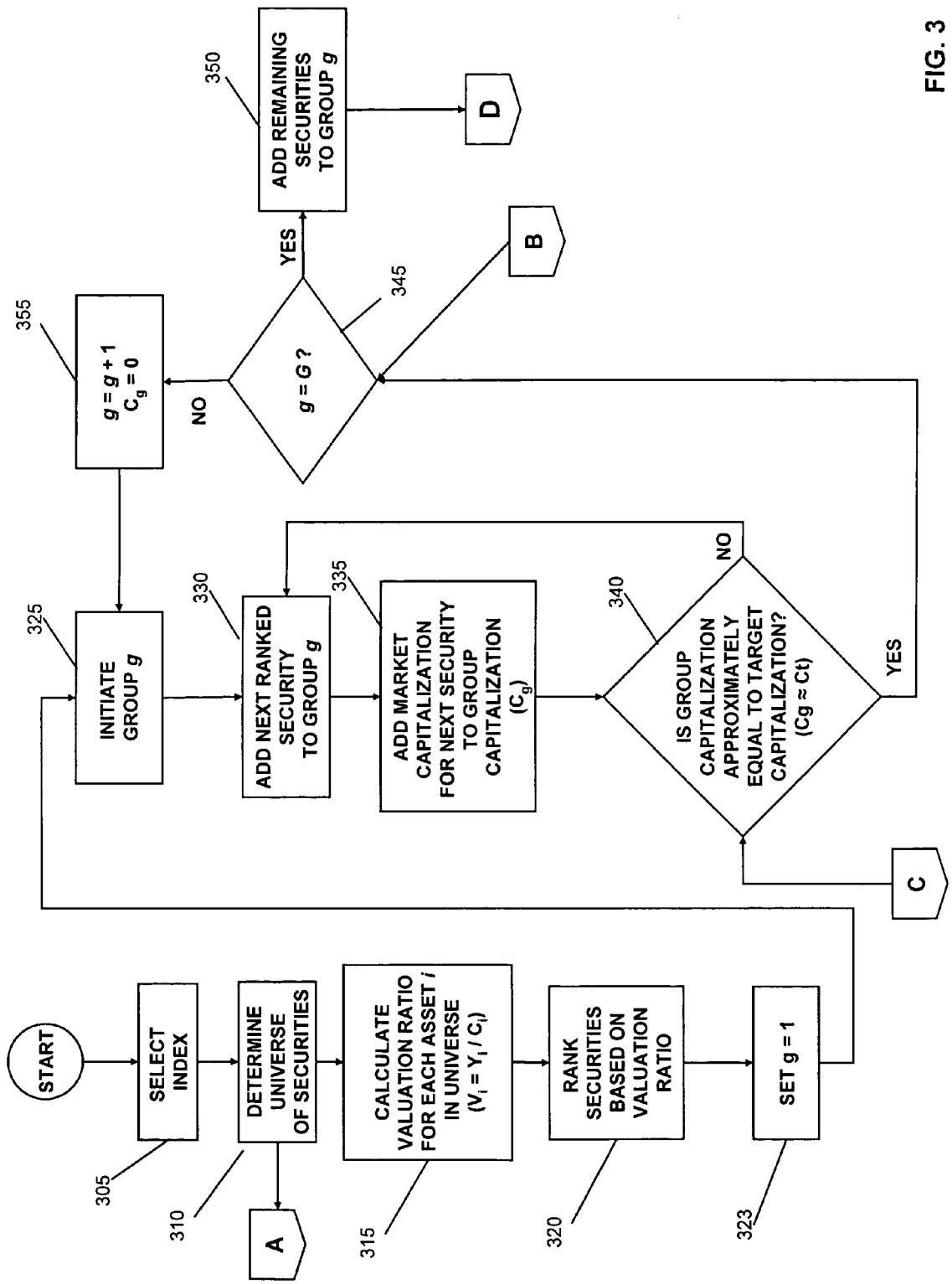
FIG. 3 is a flow chart depicting a process for grouping assets in accordance with one embodiment of the invention.
Figure 4:
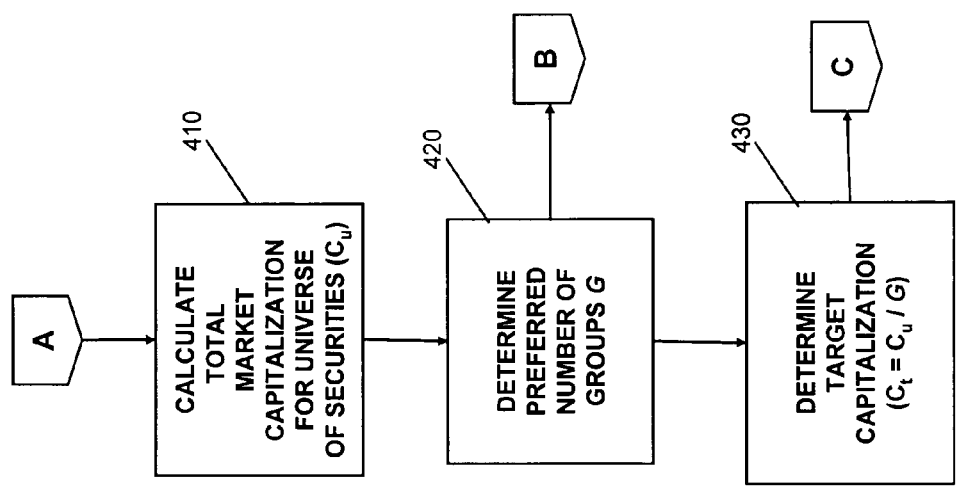
FIG. 4 is a flow chart depicting a process for determining a number of groupings for assets in an investment vehicle in accordance with one embodiment of the invention.
Figure 5:
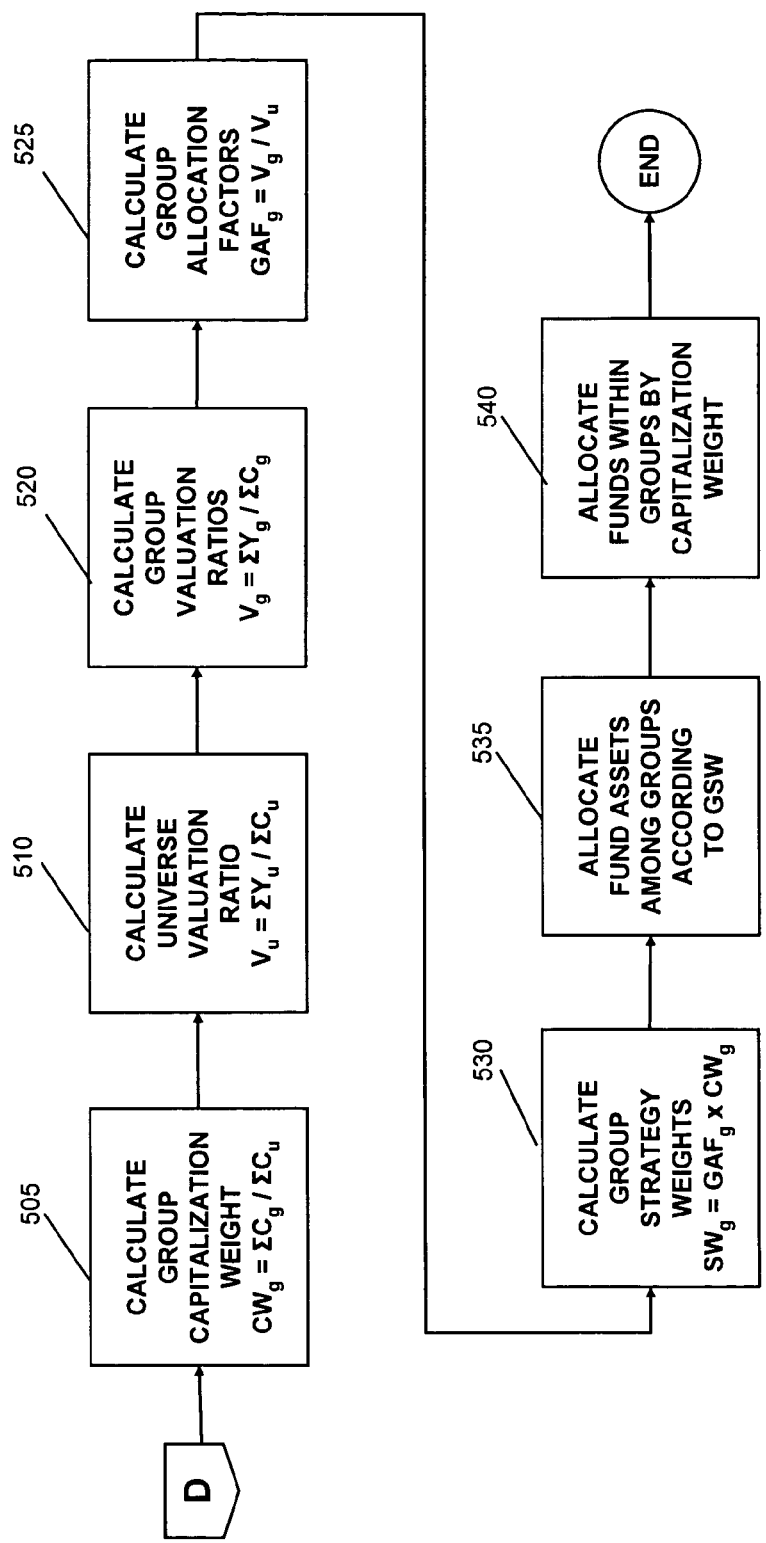
FIG. 5 is a flow chart depicting a process for determining weighting factors for groups of assets in an investment vehicle in accordance with one embodiment of the invention.

FIGS. 3, 4 and 5 illustrate in greater detail one example of such a process in accordance with various embodiments of the invention. Referring first to FIG. 3, an index is selected (STEP 305) that will serve as the underlying list of assets in which the fund will invest. In some cases, the index also provides a "benchmark"—e.g., the performance of the fund can be compared to the performance of the benchmark to determine if the preferred allocation has positively or negatively impacted the funds performance relative to the index. For example, if the S&P 500 index provided an average year-over-year return of 5%, but the fund, using the same assets that make up the index but using the group-weighting techniques described herein, provides a 7% year-over-year return, the additional 2% can be attributed to the weighting strategy. This additional 2%—possibly achieved without necessitating additional risk—provides a significant benefit to the investors and may attract additional capital to the fund.

Once an index has been selected (or built, as the case may be), the universe of assets in which the fund will invest is determined (STEP 310). In some cases, the assets that make up the index and the universe of assets may be the same (e.g., the fund will invest in all 500 equities that comprise the S&P 500). Conversely, in some embodiments the analysts and/or portfolio managers may perform additional analysis (either quantitative, qualitative, or both) to further select which assets are to be added to the portfolio. In some cases, assets that are included in the selected index may be eliminated, in other cases assets may be added, and in still other instances, both approaches may be used. As one example, a find may be based on the RUSSELL 3000 index. However, the portfolio manager may decide (or, in some cases the charter of the fund may dictate) that in addition to investing in the 3000 equities that comprise the index, 10% of the fund is to be allocated to cash. In other examples, an analyst may perform detailed analysis on many of the companies that are included in the index, and determine that some are not worthy of investment, based, for example, on poor financial performance or poor management, as well as other factors.

Referring briefly to FIG. 4, a total market capitalization ($C_u$) for the universe of assets may be calculated (STEP 410). The total market capitalization $C_u$ of the universe of assets may be calculated, for example, by summing each of the individual market capitalizations of each asset, which may be determined by multiplying the value of one unit of the asset (e.g., a share in the case of a stock or fund, a lot in the case of an option, or the price of each bond in the case of series of bonds) by the number of outstanding units. For example, if n different assets are included in the universe U, and each asset has a price P and J units outstanding, the total market capitalization can be calculated using Equation 1:

$$C_u = \sum_{i=1}^{n} P_i \times J_i. \qquad \text{Equation 1}$$

Based on the total market capitalization $C_u$, the number of assets n, or other factors, a preferred number of groupings G may be determined (STEP 420). In some embodiments, the number of groupings G is predetermined—i.e. the number of assets n and total market capitalization $C_u$ are not a factor. For example, the number of groupings may be based on a determination that each grouping should include a predetermined number of assets. Specifically, the number of groupings may be based on a percentile valuation ranking of the universe of assets—e.g., one group may comprise the bottom 10% of assets ranked by valuation, the next group may comprise the next 10% (or some other percentage), and so on.

However, in some cases, the number of groupings may be determined by one or more of these factors, and in many instances certain guidelines may be established. For example, certain implementations may require that the number of groupings be above a minimum number (e.g., 5) that below which the effect of the group weighting is either too attenuated or is effectively lost. Similarly, one approach may place an upper bound on the number of groupings, again because as the number of groupings G approaches n, the effect of the grouping may become marginalized. In some cases, the number of groupings may be based on a predetermined fraction of the number of assets n. For, example, the positive effect of the group weightings may achieve maximum effect where the number of groupings is below some threshold (e.g., 10%). In a more specific case, a ratio of about 1.67% of the total number assets is used, in which case a universe of 1200 assets results in 60 groupings of 20 assets per group. In other implementations, the number of groups n may be based on a preferred fraction of the total market capitalization $C_u$.

Once the number of groups has been determined, a target capitalization may be calculated (STEP 430) for each group. The target capitalization, $C_t$, represents a preferred market capitalization of all the assets in each group, and may be calculated using Equation 2:

$$C_t = C_u/G \qquad \text{Equation 2.}$$

In alternative embodiments, other metrics may be used as a basis for determining the groupings. For example, instead of using market capitalization of the assets, total profits, assets (fixed, tangible, intangible), sales, profit margins, cash balance, liabilities (short-term and/or long-term), spending (on, for example research and development), revenue, value of real property owned, and any combination of these or other quantifiable measures may be used to calculate both a total universe and group metric on which the groupings are based.

Referring again to FIG. 3, a fundamental valuation may be calculated (STEP 315) for each asset, and for the universe of assets in total. In certain instances in which the assets represent equities issued by corporations, the valuation may be the book value (BV) of the company, which may be calculated using Equation 3:

$$BV_i = \text{TotalAssets}_i - \text{TotalLiabilities}_i \qquad \text{Equation 3}$$

and, as a result, the total valuation of the universe of assets $BV_u$ may then be calculated using Equation 4:

$$BV_u = \sum_{i=1}^{n} BV_i. \qquad \text{Equation 4}$$

In other circumstances, alternative techniques and/or metrics may be used to determine a fundamental valuation of the assets. For example, in cases where the assets include bonds, the valuation may be based on the yields of the bonds, credit ratings of the bonds (e.g., AAA, junk, etc.), par value, or on a valuation of the underlying issuer. Other measures, such as earnings (either gross or net of interest and tax), sales, revenue, etc. that reflect a fundamental valuation of the underlying assets, are also contemplated.

In some embodiments, the valuation can be a combination of valuation ratios V expressed, for example, as X/P or Y/C as described above. Measures of valuation may be combined by using any equal-weighted or otherwise weighted average of relative valuation (RV). Relative valuation is defined for some asset i and universe of assets u according to Equations 5-7:

$$RV_i = \frac{(Y/P)_n}{(Y/P)_u}, \text{ where} \qquad \text{Equation 5}$$

$$(Y/P)_n = (Y_n/C_n), \text{ and} \qquad \text{Equation 6}$$

$$(X/C)_u = \left( \frac{\sum_{i=1}^{n} Y_i}{\sum_{i=1}^{n} C_i} \right). \qquad \text{Equation 7}$$

In some cases, the valuation measure of (X/P) may be substituted for (Y/C). High measures of average relative valuation (e.g., where $RV_i > 1$) indicate assets where average (Y/C) is higher than universe average $(Y/C)_u$, while low measures of average relative valuation (<1) indicate assets where average Y/C is lower than universe average $(Y/C)_u$.

With a valuation (or relative valuation) calculated for each asset, the assets are then ranked (STEP 320) based on the valuation. The ranking may be, for example, from lowest to highest valuation, or highest to lowest. In some embodiments, the portfolio manager, analysts, and/or an allocation methodology may provide additional input into the ranking process to adjust certain assets up or down in the ranking, to reorder certain assets, and/or to confirm that the ranking conforms to predetermined guidelines. The resulting ranked listing of assets may then be used as input into the grouping process.

The grouping process begins by setting a group counter g to 1 (STEP 323), initiating a first grouping g (STEP 325) and assigning the first asset i from the ranked list to grouping g (STEP 330). In some instances, the grouping process may start at the bottom of the list, depending on the methodology used during the ranking process. The market capitalization for the first asset ($C_i$) is added to the market capitalization of the first group ($C_g$) (STEP 335) which is maintained as a running sum of the total capitalization of all assets in that group. After each asset is added, the sum total of the group capitalization $C_g$ is compared (STEP 340) to the target capitalization $C_t$. If the group capitalization $C_g$ for the current group is not within some acceptable threshold of the target capitalization $C_t$, the process repeats, with the next asset (based on the ranking) being added to the current group (STEP 330) and its market capitalization being added to the group capitalization $C_g$ (STEP 340). When the group capitalization $C_g$ for the current group is equal to or within some acceptable threshold of the target capitalization $C_t$, the current grouping g is closed. In some embodiments, assets are added to the group until the group capitalization $C_g$ is within some threshold (e.g., ±5%) of the target $C_t$. If, in some cases, the group capitalization $C_g$ is below the threshold, a next asset may be added to the group, even though it will cause the group capitalization $C_g$ to exceed the target $C_t$. In this manner, the composition of each group may be based on both a target capitalization for the groupings and the running sum of the actual market capitalization of the assets in each grouping as calculated during the grouping process. Such an approach allows for greater flexibility in determining the groupings (both in number and composition). Further, using the ranked listing as input into the grouping process facilitates the distribution of assets among the groups based on both market capitalization and an underlying valuation (e.g., book value).

If the group counter g is equal to the preferred number of groups G (STEP 345) any remaining assets are added to the current group (STEP 350). If, on the other hand, the current value of the group counter g is not equal to G (i.e., there remain additional groupings to define and additional assets to be added), the group counter g is incremented by one and the value of the group capitalization $C_g$ is reset to zero (STEP 355). As a result, once the grouping has been exhausted, each asset is assigned to a group and the total market capitalization of the assets in each group is approximately equal, e.g., the target capitalization $C_t$.

In some embodiments, the target capitalization $C_t$ may be used as a baseline from which individual, non-uniform group target capitalization values are calculated. For example, if the preferred number of groups is twenty and the target capitalization $C_t$ for each group is roughly 5% (i.e., 100%/20) of the total capitalization $C_u$, a non-uniform statistical distribution may be applied to the target capitalization such that the group capitalization for groupings of mid-valued assets (i.e., groups 8 through 12) have a disproportionately higher group capitalization than groups at either end (i.e., groupings 1 though 7 and 13 through 20). Distribution models such as the normal distribution, exponential distribution, and others may be used to spread the preferred market capitalization among the groups according to a predetermined statistical distribution.

FIG. 5 illustrates one embodiment in which the group strategy weights (GSW) for each grouping may be derived using the ranked and grouped assets. Based on the group capitalization $C_g$ and the total capitalization $C_u$, a group capitalization weight ($CW_g$) may be calculated (STEP 505) using Equation 8:

$$CW_g = C_g/C_u \qquad \text{Equation 8.}$$

In this example, the group capitalization weight represents the actual share of the total capitalization (i.e., the capitalization weight) of the assets contained in each group as compared to the overall capitalization of all the assets. In some cases, the group capitalization weight $CW_g$ may be equal to the target capitalization $C_t$ such that the group capitalization weight is the same for each grouping. However, in certain cases the grouping methodology described above will not result in an allocation that matches the target exactly, and therefore certain groups may have a slightly higher or lower group capitalization than others.

To relate the market price of the assets within the universe of assets to a fundamental valuation metric for the entire universe of assets, a universe valuation ratio ($V_u$) may be calculated (STEP 510) based, for example, on the total capitalization $C_u$ and the total valuation metric $Y_u$ of all the assets using Equation 9:

$$V_u = \Sigma Y_u / \Sigma C_u \qquad \text{Equation 9.}$$

Similarly, to relate the market price of the assets within each grouping to a fundamental valuation metric for the assets for each grouping, a group valuation ratio ($V_g$) may be calculated (STEP 515) based, for example, on the total capitalization $C_g$ and the total valuation metric $Y_g$ of all the assets using Equation 10:

$$V_g = \Sigma Y_g / \Sigma C_g \qquad \text{Equation 10.}$$

A group allocation factor (GAF) may also be derived (STEP 520) to reflect the relative relationship between the valuation of the assets in each grouping to the fundamental valuation of the assets in the universe of assets. For example, the group allocation factors may be calculated for each grouping g using Equation 11:

$$GAF_g = V_g/V_u \qquad \text{Equation 11.}$$

The group allocation factors represent a measure of the valuation of groups of assets relative to the valuation of the overall universe of assets. The group allocation factors may then be used in conjunction with the group capitalization weights ($CW_g$) to determine the group strategy weights ($SW_g$) (STEP 525), using Equation 12:

$$SW_g = GAF_g \times CW_g \qquad \text{Equation 12.}$$

As a result, a greater weighting of funds is allocated to groupings of assets that are relatively undervalued without exposing the portfolio to an unacceptable degree of risk.

Having calculated a group strategy weight for each grouping, the investable assets within the fund may then be allocated accordingly (STEP 530). For example, if a particular grouping has a group weighting factor of 12%, 12% of the total assets of the fund are allocated to purchasing assets within that group. If, on the other hand, no weighting were used, the assets attributed each of the groupings would be reflect the actual market capitalization weight.

Within groupings, capital may be allocated among the individual assets using any number of techniques, including, for example, capitalization weighting (STEP 535).

Referring to FIG. 6, chart 600 indicates one implementation of the invention. Note that the calculations presented in this example are for illustrative purposes only, and in certain cases slight inaccuracies may be introduced due to rounding. In this example, the total number 605 of assets is 1200, and the preferred number of groupings 610 is 20. The valuation of each asset is calculated, and the 1200 assets are ranked accordingly. A total market capitalization 615 for all 1200 assets is 100%, and based on the twenty groupings, a target capitalization of 5% is set. Assets are added to groupings according to the iterative technique described above, resulting in the groupings of assets 620. Group valuation 625 is calculated for each grouping. As one example, grouping 1, which includes 135 assets, represents 5% of the total universe capitalization. In some embodiments in which a target group capitalization is calculated and the actual group capitalizations can be slightly higher or lower, the target and actual group capitalizations can be used to compute an group capitalization weighting (e.g., group cap/universe capitalization).

The valuation (book value/price in some specific embodiments) of the assets within each group 625 and for the overall universe of assets 640 is calculated as described above. In the present example, the valuation for the assets in grouping 1 is 0.152, whereas the valuation for all assets is 0.067. Based on these valuations, the group allocation factor 635 for grouping 1 is 2.280 (i.e., 0.152/0.067). In contrast, for grouping 20 (a grouping comprised of assets having higher valuations) the group allocation factor 635 is 0.334 (i.e., 0.022/0.067).

Continuing with the present example, the group strategy weights SW 645 may be calculated by multiplying group capitalization weights 615 by their respective group allocation factor 635. For example, the group strategy weight 645 of grouping 1 is 11.40% (i.e., 5.0%×2.280). The group strategy weight represents the degree to which the allocation of assets in this grouping is to be "tilted" based on the ratio of the valuation of the assets in that grouping 625 to the valuation of the universe of assets 640. Using the group strategy weights for each group, assets within the fund may be allocated accordingly. Within groups, assets may be weighted according to market capitalization. For comparison purposes, column 660 in represents the difference between group strategy weights and group capitalization weights. For example, the methodology allocates 6.40% (11.40%-5.0%) more of portfolio weight to grouping 1 than would traditional capitalization weighting techniques.

Figure 7:
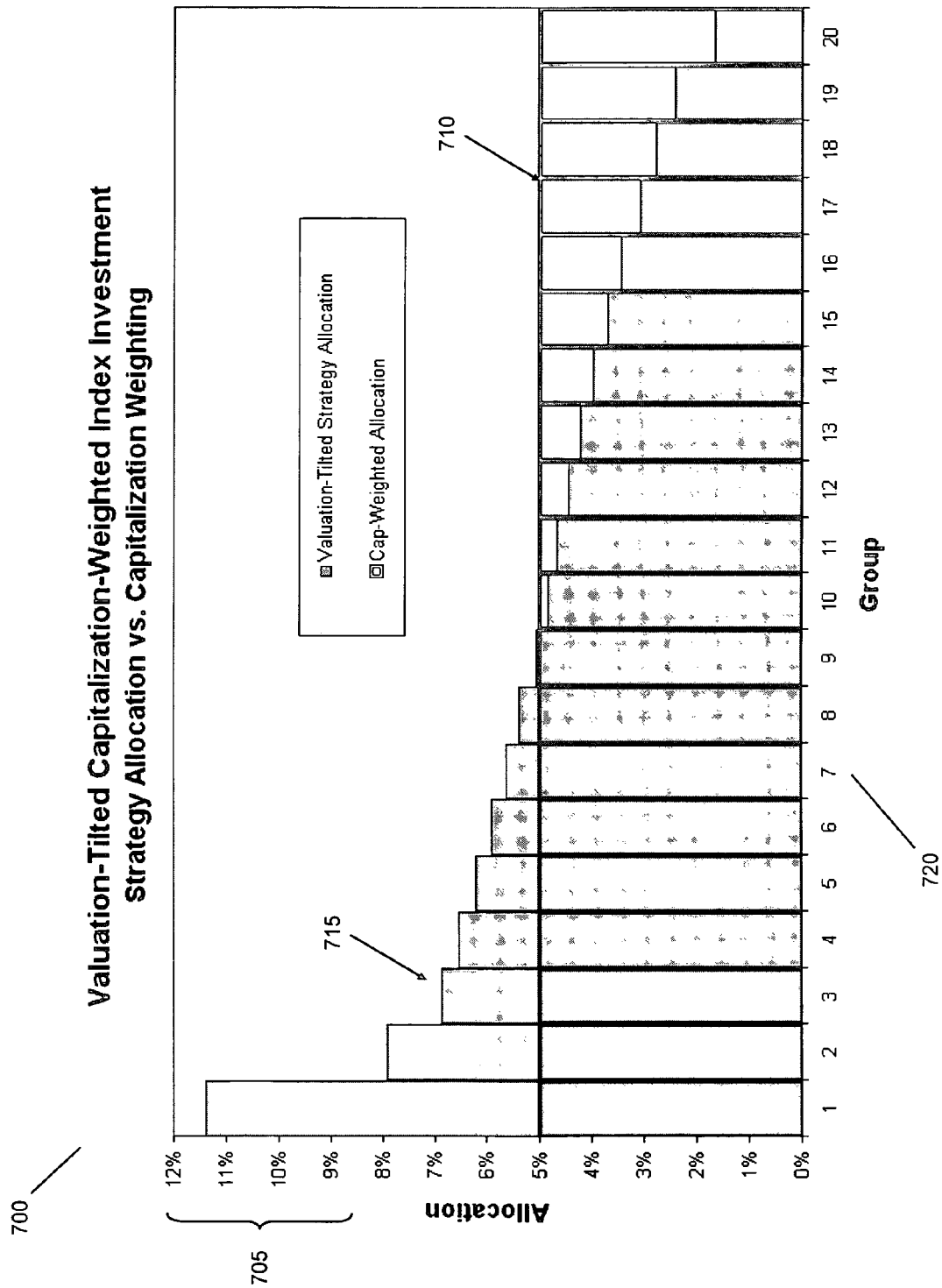
FIG. 7 is a graphical representation of asset weighting results in accordance with one embodiment of the invention as compared to results using a non-valuation weighted approach.

FIG. 7 is a graphical representation 700 of the differentiation between the group weighting techniques described herein and the conventional capitalization-weighted approach. As shown, the groupings 720 are listed along the x-axis of the graph 700 and percentage 705 of assets of the fund attributed to each grouping 720 is charted along the y-axis. Using a capitalization-weighted approach, the distribution of assets among the groupings 720 would be approximately equal, resulting in the series 710 where each grouping is allocated approximately 5% of the overall assets. In contrast, using the valuation weighted approach described herein results in the series 660 in which the allocation is higher than 5% for groupings 1 through 9 and lower than 5% for groupings 10 through 20. As a result, the assets that would typically be allocated to the groupings comprised of higher valuation assets (groupings 10-20) are redirected to those with lower valuations (groupings 1-9) in an attempt to take advantage of lower valuation assets that may outperform those with higher valuations.

In some embodiments, the methods and techniques of the present invention described herein may be implemented in hardware or software, or a combination of both on a general-purpose computer. In such an embodiment, the program may be written in any one of a number of high-level languages, such as FORTRAN, PASCAL, C, C++, C#, Java, Tcl, or BASIC. Further, the program can be written in a script, macro, or functionality embedded in commercially available software, such as EXCEL or VISUAL BASIC. Additionally, the software may be implemented in an assembly language directed to a microprocessor resident on a computer. For example, the software can be implemented in Intel 80×86 assembly language if it is configured to run on an IBM PC or PC clone. The software may be embedded on an article of manufacture including, but not limited to, "computer-readable program means" such as a floppy disk, a hard disk, an optical disk, a magnetic tape, a PROM, an EPROM, or CD-ROM.

It will therefore be seen that the foregoing represents an improved method and supporting system for allocating assets among assets within an investment portfolio. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed. Moreover, although the above-listed text and drawings contain titles and headings, it is to be understood that these titles and headings do not, and are not intended to, limit the present invention, but rather, they serve merely as titles and headings of convenience. The scope of the invention is thus indicated by the appended claims and all changes which come within the meaning and range of equivalency of the claims are therefore intended to be embraced.

What is claimed is:

1. An article of manufacture having computer-readable program portions embodied thereon for determining a composition of and allocation of funds within an investment vehicle comprising a plurality of assets, the article comprising computer-readable instructions for:
    identifying the plurality of assets to be included in the investment vehicle;
    calculating an asset valuation for each of the plurality of assets;
    creating a ranked listing of the plurality of assets based on their respective asset valuations;
    determining a preferred number of asset groupings and calculating a target group capitalization for each grouping;
    assigning each of the plurality of assets to one of a plurality of the groupings based on a target group capitalization by iteratively:
        (i) calculating a group capitalization for the first grouping;
        (ii) comparing the group capitalization to the target group capitalization for the first grouping; and
        (iii) adding a next asset from the ranking to the first grouping until the group capitalization is within a predetermined threshold of the target group capitalization; and
        (iv) initiating a next grouping using a next asset from the ranking until all assets are associated with a grouping;
    determining a group capitalization weight for each grouping, wherein the group capitalization weight for each grouping comprises the group capitalization for each respective grouping divided by the total market capitalization for the plurality of assets; and
    allocating funds among the assets within each grouping based at least in part on the group capitalization weights attributed thereto.

2. The article of manufacture of claim 1 further comprising instructions for basing the target group capitalization at least in part on the number of groupings that comprise the plurality of groupings and a total capitalization for the plurality of assets.

3. The article of manufacture of claim 2 wherein the total capitalization for the plurality of assets comprises a total market capitalization for the plurality of assets.

4. The article of manufacture of claim 3 wherein the number of groupings is greater than five.

5. The article of manufacture of claim 3 wherein the number of groupings is fewer than a predetermined fraction of a total number of assets that comprise the plurality of assets.

6. The article of manufacture of claim 5 wherein the predetermined fraction is ten percent.

7. The article of manufacture of claim 1 wherein the asset valuation comprises one of a book value for the asset, a book value for the asset divided by a price for the asset and a book value for the asset divided by a capitalization for the asset.

8. The article of manufacture of claim 1 wherein the ranked listing comprises a listing of the plurality of assets from lowest asset valuation to highest asset valuation.

9. The article of manufacture of claim 8 wherein each of the groupings comprises a subset of contiguously listed assets from the ranked listing.

10. The article of manufacture of claim 1 wherein the group capitalization comprises a total market capitalization for all assets in each respective grouping.

11. The article of manufacture of claim 1 wherein the group capitalization for each grouping comprises the total market capitalization of all assets in each respective grouping and the group capitalization weight for each grouping comprises the group capitalization for each respective grouping divided by the total market capitalization for the plurality of assets.

12. The article of manufacture of claim 11 further comprising instructions for allocating funds to the assets by calculating a group valuation ratio comprised of a group valuation metric for each respective grouping divided by the group capitalization.

13. The article of manufacture of claim 12 wherein the group valuation metric comprises one of (i) a book value for the assets in each respective grouping, (ii) a book value for the assets in each respective grouping divided by a price for the assets in that respective grouping, and (iii) a book value for the assets in each respective grouping divided by a capitalization for the assets in that respective grouping.

14. The article of manufacture of claim 12 further comprising instructions for allocating funds to the assets by calculating a group allocation factor for each respective grouping, the group allocation factor comprising the group valuation ratio divided by a total market valuation ratio.

15. The article of manufacture of claim 14 wherein the total market valuation ratio of the plurality of assets comprises one of (i) a book value for the plurality of assets, (ii) a book value for the plurality of assets divided by a price for the plurality of assets, (iii) and a book value for the plurality of assets divided by a capitalization for the plurality of assets.

16. The article of manufacture of claim 14 wherein the group strategy weight comprises the group allocation factor for each respective grouping multiplied by the group capitalization weight for each respective grouping.

17. The article of manufacture of claim 1 wherein the investment vehicle is selected from the group of a mutual fund, a hedge fund, and an exchange traded fund.

18. The article of manufacture of claim 1 wherein the plurality of assets comprise assets selected from an index.

* * * * *